(12) United States Patent
Josel et al.

(10) Patent No.: US 8,058,431 B2
(45) Date of Patent: *Nov. 15, 2011

(54) FLUORESCENT DOUBLE STRANDED DNA BINDING DYES

(75) Inventors: Hans-Peter Josel, Weilheim (DE); Dieter Heindl, Paehl (DE); Bernhard Irlinger, Munich (DE); Christian Weilke, Penzberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/417,735

(22) Filed: Apr. 3, 2009

(65) Prior Publication Data

US 2009/0275037 A1     Nov. 5, 2009

Related U.S. Application Data

(63) Continuation of application No. PCT/EP2007/009407, filed on Oct. 30, 2007.

(30) Foreign Application Priority Data

Nov. 2, 2006   (EP) ..................................... 06022800

(51) Int. Cl.
    *C07D 417/06*     (2006.01)
(52) U.S. Cl. ...................................... 544/284
(58) Field of Classification Search ............ 544/284
    See application file for complete search history.

(56) References Cited

U.S. PATENT DOCUMENTS

| 4,937,198 A | 6/1990 | Lee et al. |
| 5,658,751 A | 8/1997 | Yue et al. |
| 2005/0233335 A1 | 10/2005 | Wittwer et al. |

FOREIGN PATENT DOCUMENTS

| GB | 425609 | 3/1935 |
| WO | 2004038038 | 5/2004 |

OTHER PUBLICATIONS

Alfimov, M. et al., "Synthesis and spectroscopic studies of novel photochromic benzodithiacrown ethers and their complexes," J. Chem. Soc., Perkin Trans. 2 (1996) 1441-1447.
Fry, D. et al., "The Reactivity of the Alkylthio-group in Nitrogen Ring Compounds. Part IV. Quaternary Salts of 4-Substituted Quinazolines," J. Chem. Society (1960) 5062-5072.
Gromov, S. et al., "Reaction of Quinazoline Derivatives with Quaternary Salts of Heterocyclic Basis," Chemistry of Heterocyclic Compounds 28 (1992) 559-566.
Gromov, S. et al., "Reactions of Quinazolinium Salts with Quaternary Heterocyclic Salts Yeilding 3-hetarylquinolines," Russian Chemical Bulletin 47/6 (Jun. 1998) 1179-1185.
Moreda, W., et al., "Novel Heterocyclic Dyes as DNA Markers. Part I. Synthesis and Characterization," Tetrahedron 53/37 (1997) 12595-12604.
Zipper, H. et al., "Investigations on DNA Intercalation and Surface Binding by SYBR Green I, its Structure Determination and Methodological Implications," Nucleic Acids 32/12 (2004) e103.

*Primary Examiner* — James O Wilson
*Assistant Examiner* — Brian McDowell

(57) ABSTRACT

Disclosed is a fluorescent dye comprising a benzothiazolium moiety and a pyrimidinium moiety connected by a monomethine bridge, characterized in that (i) the 2-position of the pyrimidine carries a substituent which starts with a C-atom and (ii) the 5- and 6- positions of the pyrimidine ring are an integral part of a further aromatic ring structure as exemplified by the following:

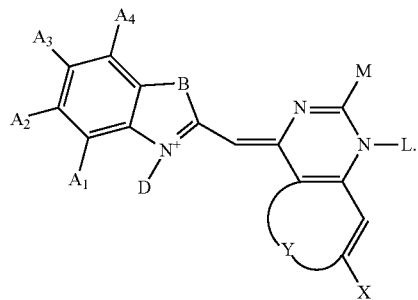

3 Claims, 8 Drawing Sheets

Synthesis R03

Synthesis R04

Synthesis R11

Synthesis R12

Synthesis R13

Synthesis R14

Synthesis R26

Synthesis R27

Synthesis R28

FLUORESCENT DOUBLE STRANDED DNA BINDING DYES

RELATED APPLICATIONS

This application is a continuation of PCT/EP2007/009407 filed Oct. 30, 2007 and claims priority to EP 06022800.4 filed Nov. 2, 2006.

FIELD OF THE INVENTION

The present invention relates to a new class of fluorescent dyes which are capable of emitting fluorescence in case they are excited appropriately in the status of being specifically bound to a double stranded nucleic acid. Such dsDNA binding dyes are frequently used for monitoring nucleic acid amplification in real time or performing a temperature dependent DNA melting curve analysis.

BACKGROUND

Fluorescent double stranded DNA binding dyes such as ethidium bromide have been used for a long time for staining nucleic acids within gel matrices that have been subjected to electrophoresis.

Equally important, fluorescent double stranded DNA binding dyes as have been used in the art for real time monitoring of nucleic acid amplification such as PCR or melting curve analysis. The respective amplification product is detected by a fluorescent DNA binding dye which emits a corresponding fluorescence signal upon interaction with the double-stranded nucleic acid after excitation with light of a suitable wavelength. The at least partially intercalating dye SYBRGreenI (Molecular Probes, Inc.) has been proven to be suitable for this application.

Due to the fact that real time amplicon detection with this format can not discriminate between specific products and amplification artefacts such as primer/dimers, a subsequent melting curve analysis is usually performed. After completion of the PCR reaction, the temperature of the sample is constitutively increased, and fluorescence is detected as long as SYBRGreen is bound to the double stranded DNA present in the samples. Upon dissociation of the double stranded DNA the signal decreases immediately. This decrease is monitored with an appropriate fluorescence versus temperature-time plot such that a first derivative value can be determined, at which the maximum of fluorescence decrease is observed. Since primer/dimer double stranded DNAs are usually short, dissociation into single stranded DNA occurs at lower temperatures as compared to the dissociation of the double stranded specific amplification product.

There are several fluorescent double stranded DNA binding dyes known in the art which can be used as a detecting agent for real time PCR and melting curve analysis. The most prominent and most frequently used example is SYBRGreen I which is an asymmetric monomeric cyanine dye comprising an N-alkylated benzothiazolium ring system which is linked via a monomethine bridge to a pyridinium or quinolinium ring system (U.S. Pat. No. 5,658,751). More precisely, SYBRGreen has the chemical formula [2-[N-(-3-dimethylaminopropyl)-N-propylamino]-4-[2,3-dihydro-3-methyl-(benzo-1,3-thiazol-2-yl)-methylidene]-1-phenyl-quinolinium]+ (Zipper, H., et al., Nucl. Acids Res. 32 (2004) e103). In the related dye PICOGREEN (Molecular Probes, Inc.), the chemical formula reads [2-[N-bis-(-3-dimethylaminopropyl)-amino]-4-[2,3-dihydro-3-methyl-(benzo-1,3-thiazol-2-yl)-methylidene]-1-phenyl-quinolinium]+.

U.S. Pat. No. 4,937,198 discloses a related fluorescent DNA binding dye having the chemical formula 3-methyl-2-[(3,7-dimethyl-6-purinylidene)-methyl]-benzothiazolium, which has been used successfully for nucleic acid staining in cell-based assays. Further dyes and respective analytical means are disclosed in Moreda, W. and Forrester, A. R., Tetrahedron 53 (1997) 12595-12604.

WO 04/38038 discloses examples of fluorescent dsDNA binding dyes which are based on a pyrimidinium ring system and a benzothiazolium which are connected by a methine bridge. In contrast to SYBRGreen, it is possible to use these dyes for detecting PCR amplification products under saturation conditions, i.e. at high concentrations where each DNA molecule already binds a maximum number of fluorescent molecules. Within US 2005/233335, the same group of inventors discloses further specific examples of fluorescent molecules comprising a pyrimidine moiety and a benzthiazolium moiety.

Many of the disclosed dyes have successfully been used for real time PCR and amplicon melting curve analysis. However, all fluorescent double stranded DNA binding dyes described in the art either have a limited stability and/or are of only limited use for improved methods of melting curve analysis. For such improved methods of melting curve analysis which may be applied for mutation scanning (WO 04/38038), the effects of minor temperature changes with respect to the conformational status of the target nucleic acid are being analyzed.

Thus it was an object of the present invention to provide an improved double stranded DNA binding fluorescent dye with increased stability and improved performance during DNA melting curve analysis.

SUMMARY OF THE INVENTION

In a first aspect, the present invention is directed to a fluorescent dye comprising a benzothiazolium moiety and a pyrimidinium moiety connected by a mono-methine bridge, characterized in that
(i) the 2-position of the pyrimidine carries a substituent which starts with a C-atom and
(ii) the 5- and 6-positions of the pyrimidine ring are an integral part of a further aromatic ring structure.

More precisely, in a first aspect, the present invention is directed to a fluorescent dye having the formula

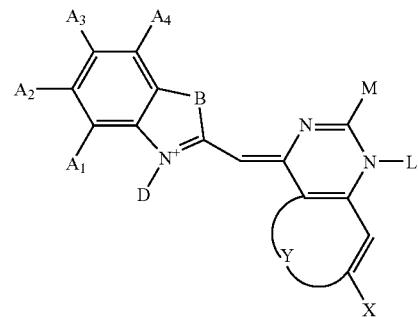

characterized in that
either all of A1, A2, A3 and A4 are H or one of A1, A2, A3 and A4 is a substituent which is preferably a halogenyl, and the others are H
B is selected from a group consisting of S, O, N—R, and C—(R)$_2$ wherein R is C$_1$-C$_6$-alkyl D is either an unsubstituted or a substituted $C_{1-6}$ alkyl X is either H or a methoxy-group Y is selected from a group consisting of S, O, N—R wherein R is $C_1$-$C_6$-alkyl, and Z1-C=C—2, wherein Z1 and Z2 independently from each other are either H or a methoxy-group L is either $CH_3$ or phenyl M is either phenyl or a substituted or unsubstituted $C_1$-$C_{18}$ amino-alkyl.

In one embodiment, D is either —(CH2)n-COOH or —(CH2)n-CO—O succinimid, characterized in that n is a natural number between 1 and 6.

Advantageously, M is —$(CH_2)$n-$N^+$—$(CH3)_3$, wherein n is a natural number between 1 and 18.

In a second aspect, the present invention is directed to a method for preparing a fluorescent dye according to claim 1 comprising the steps of a) providing a chemical substance having the formula

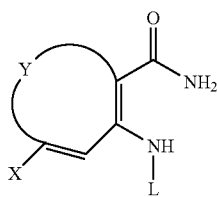

characterized in that

X is either H or a methoxy-group

Y is selected from a group consisting of S, O, N—R, wherein R is $C_1$-$C_6$-alkyl, and Z1-C=C—2, wherein Z1 and Z2 independently from each other are either H or a methoxy-group L is either CH3 or phenyl b) reacting said substance with a substituted acidic chloride in order to generate a 1,4-Dihydropyrimidin-4-one derivative c) reacting said 1,4-dihydropyrimidin-4-one derivative with a thionation reagent in order to generate a 1,4-dihydropyrimidin-thione derivative d) reacting said 1,4-dihydropyrimidin-thione derivative with Iodomethane in order to generate a 4-methylthio-pyrimidine derivative e) reacting said 4-methylthio-pyrimidine with a compound having the formula

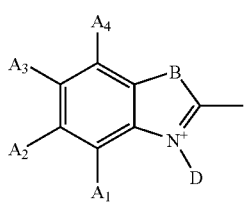

characterized in that either all of A1, A2, A3 and A4 are H or one of A1, A2, A3 and A4 is a substituent which is preferably a halogenyl, and the others are H B is selected from a group consisting of S, O, N—R, and C—(R)2 wherein R is $C_1$-$C_6$-alkyl D is either a substituted or an unsubstituted $C_1$-$C_6$ alkyl.

The compounds of the present invention may be used for a variety of different applications.

In particular, the compounds according to the present invention are used for the detection of double stranded nucleic acids.

In one embodiment, the compounds according to the present invention are used for detection of double stranded nucleic acids during a nucleic acid amplification reaction in real time.

In a second embodiment, the compounds according to the present invention are used for detection of double stranded nucleic acids during a melting curve analysis.

In a further embodiment, the compounds according to the present invention are used for detection of double stranded nucleic acids in the matrix of gel wherein double stranded nucleic acids have been subjected to Gel Electrophoresis.

DETAILED DESCRIPTION OF THE INVENTION

Compound According to the Present Invention

Figure 1:
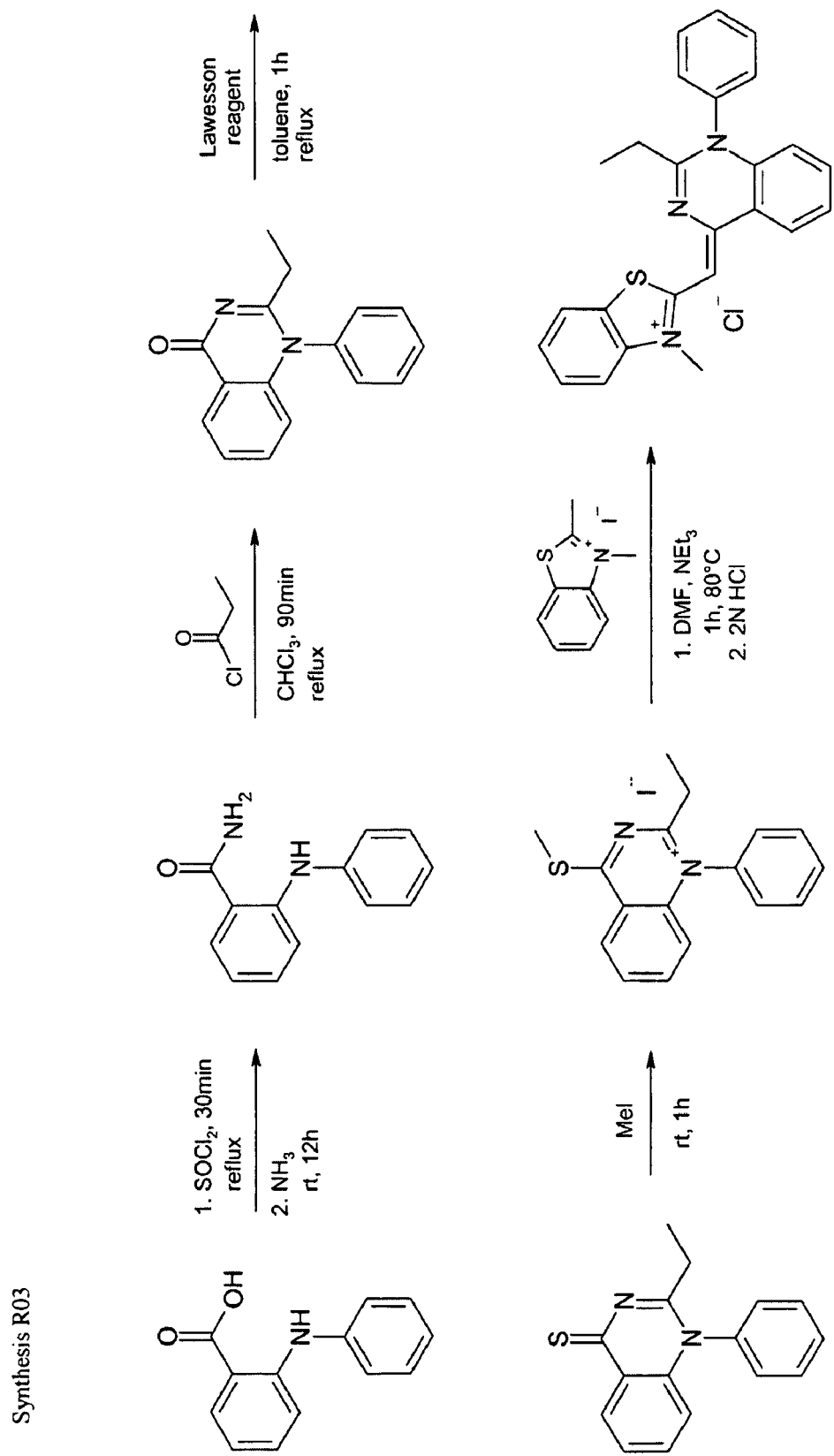
FIG. 1 Synthesis scheme for R03
FIG. 2 Synthesis scheme for R04
FIG. 3 Synthesis scheme for R11
FIG. 4 Synthesis scheme for R12
FIG. 5 Synthesis scheme R13 and R14
FIG. 6 Synthesis scheme R26
FIG. 7 Synthesis scheme for R27
FIG. 8 Synthesis scheme for R28
Figure 2:
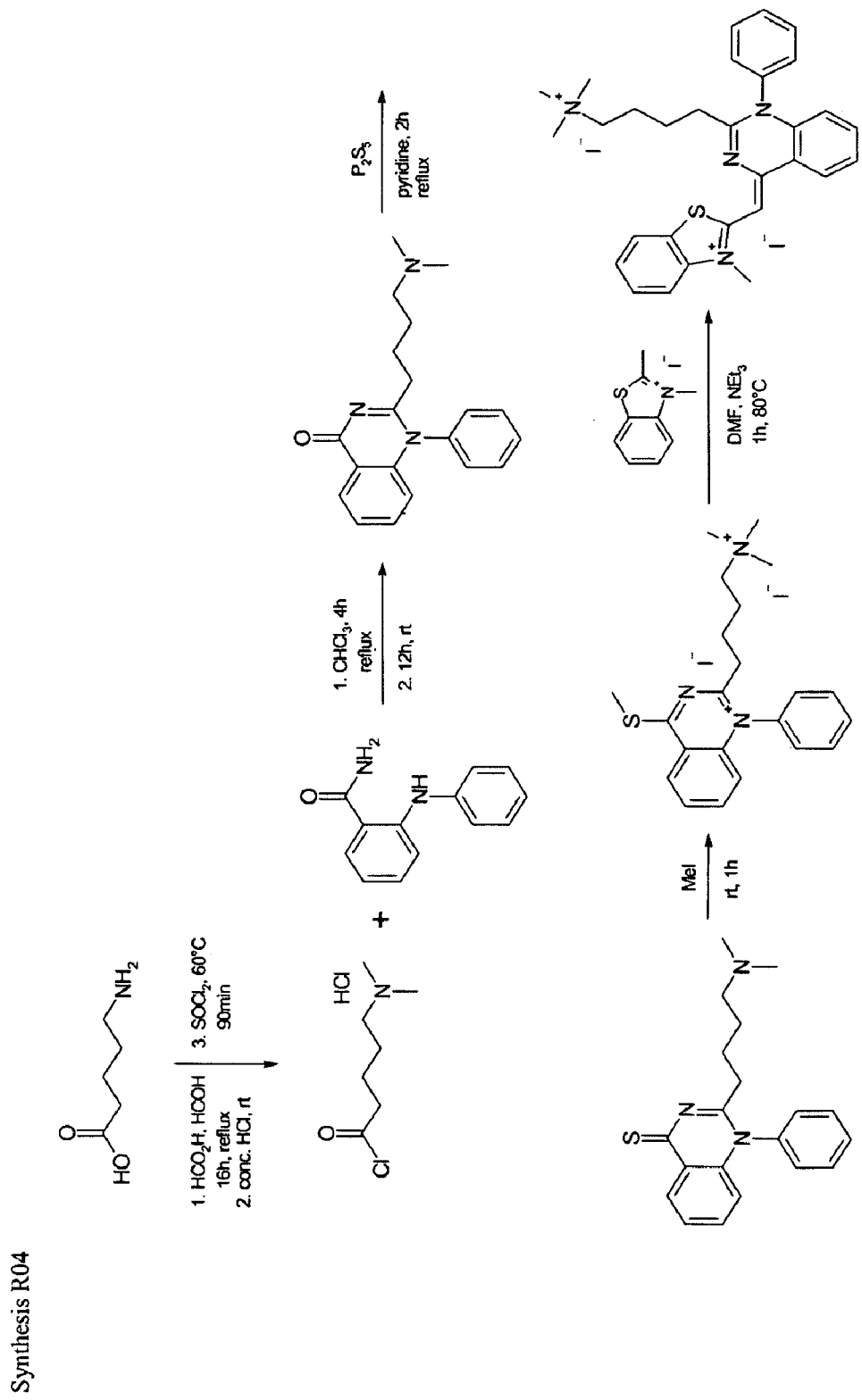
Figure 3:
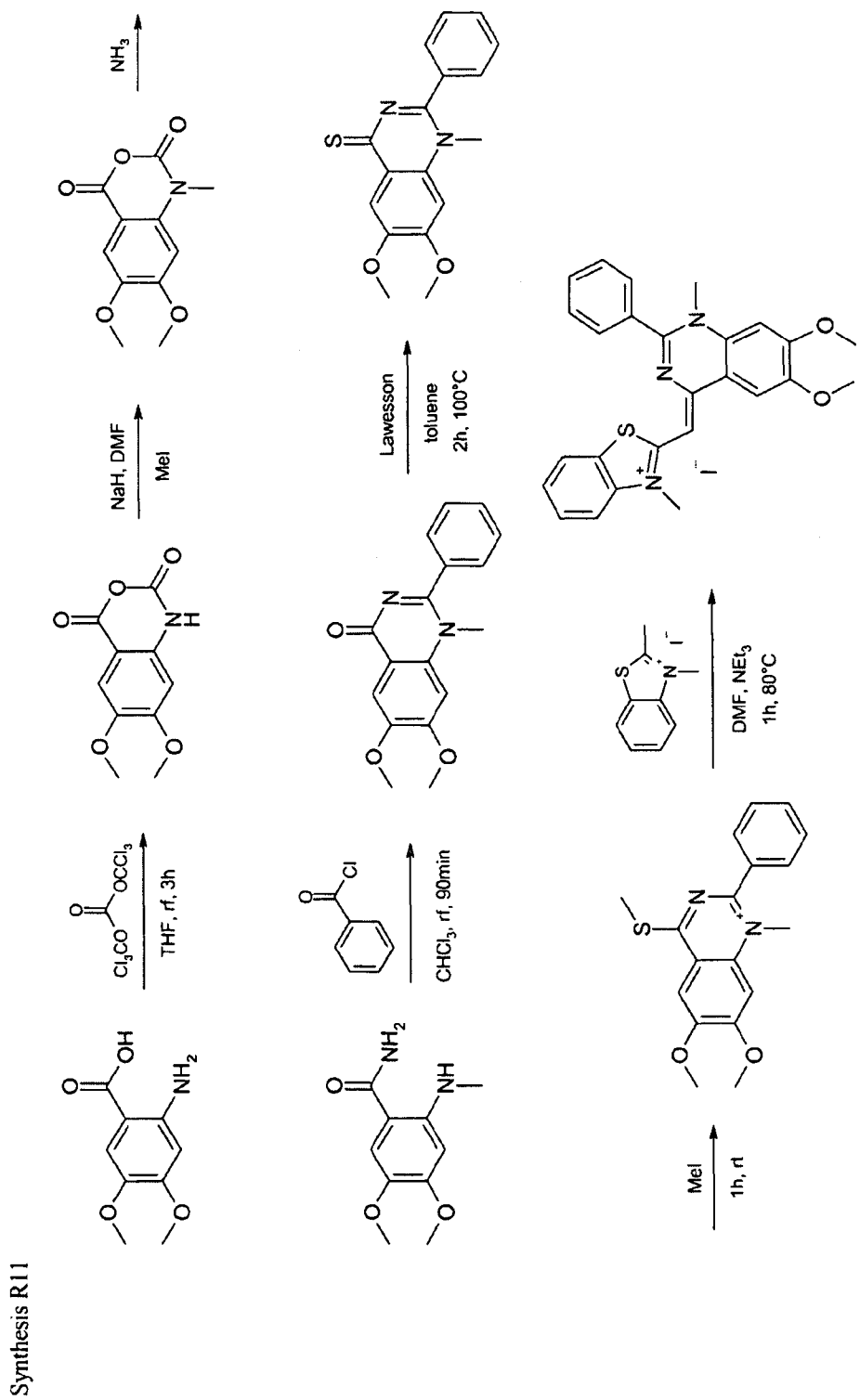
Figure 4:
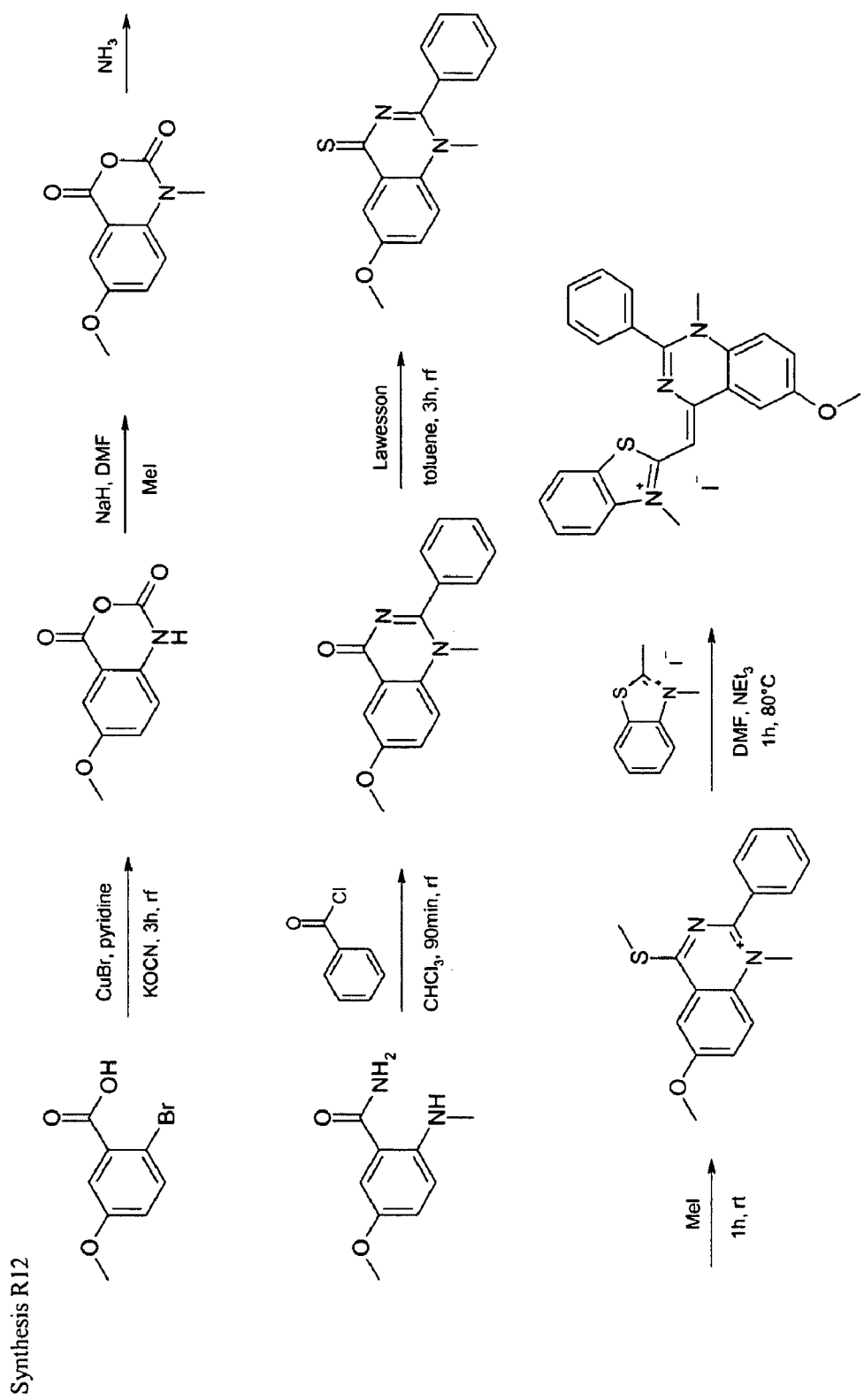
Figure 5:
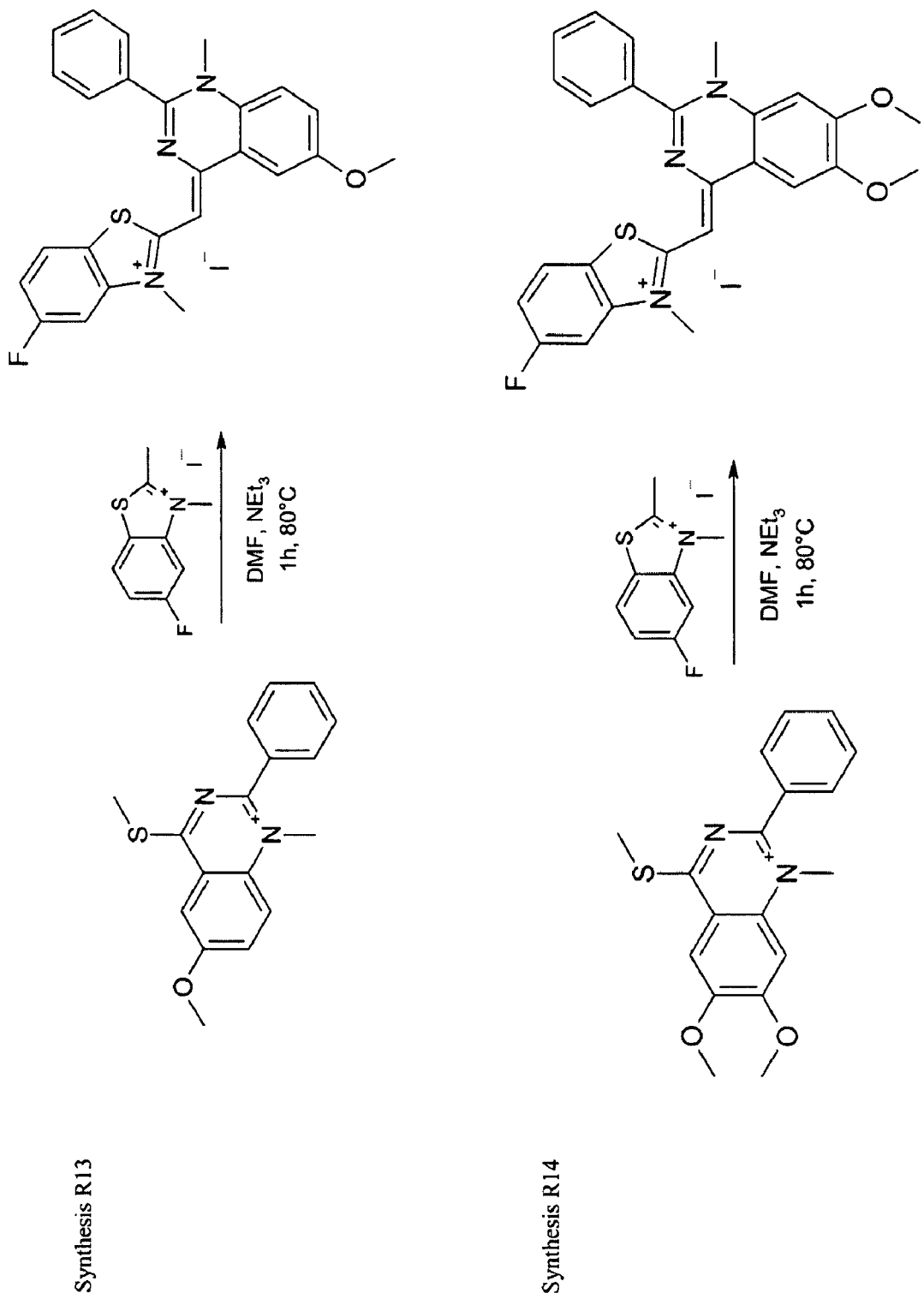
Figure 6:
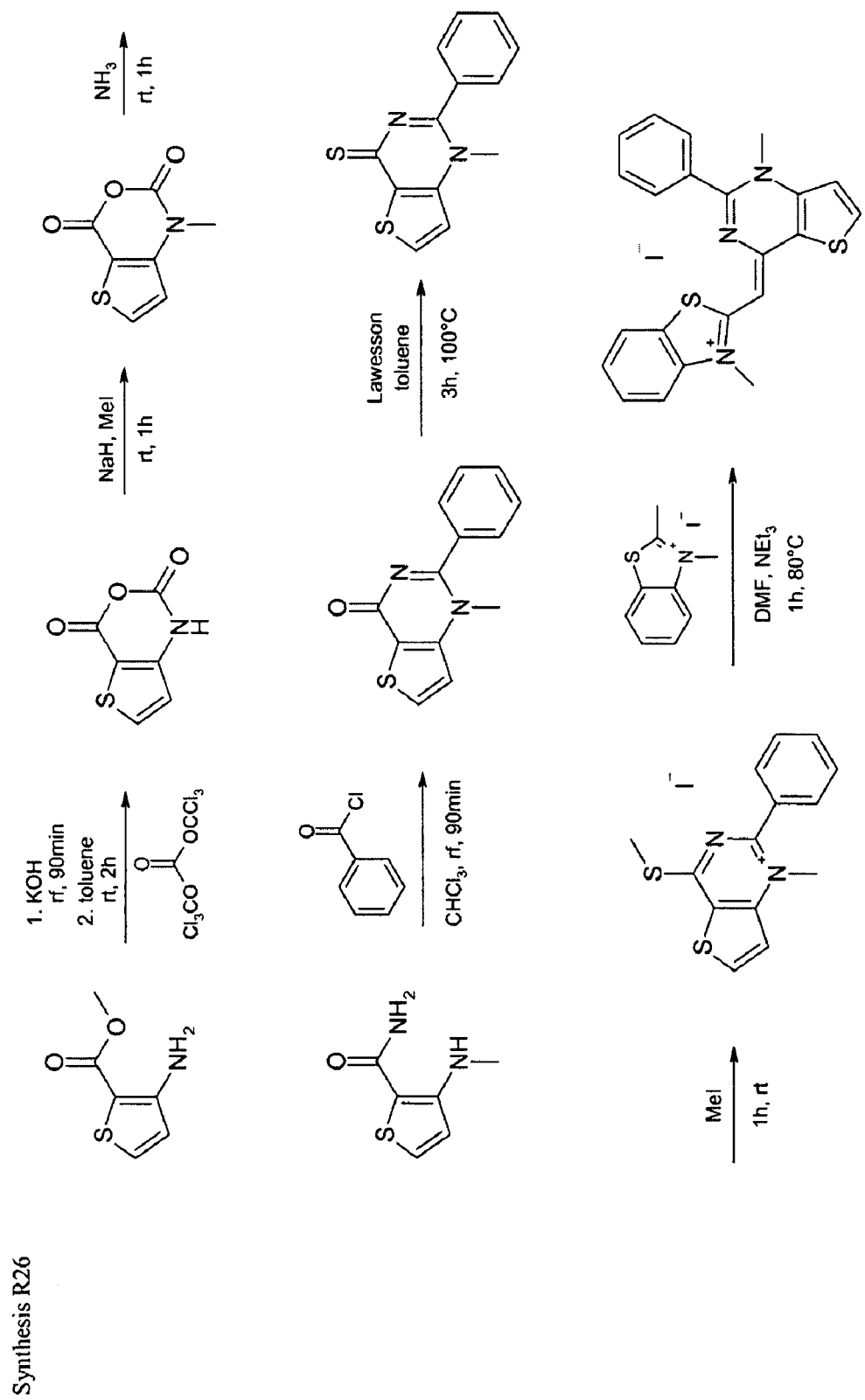
Figure 7:
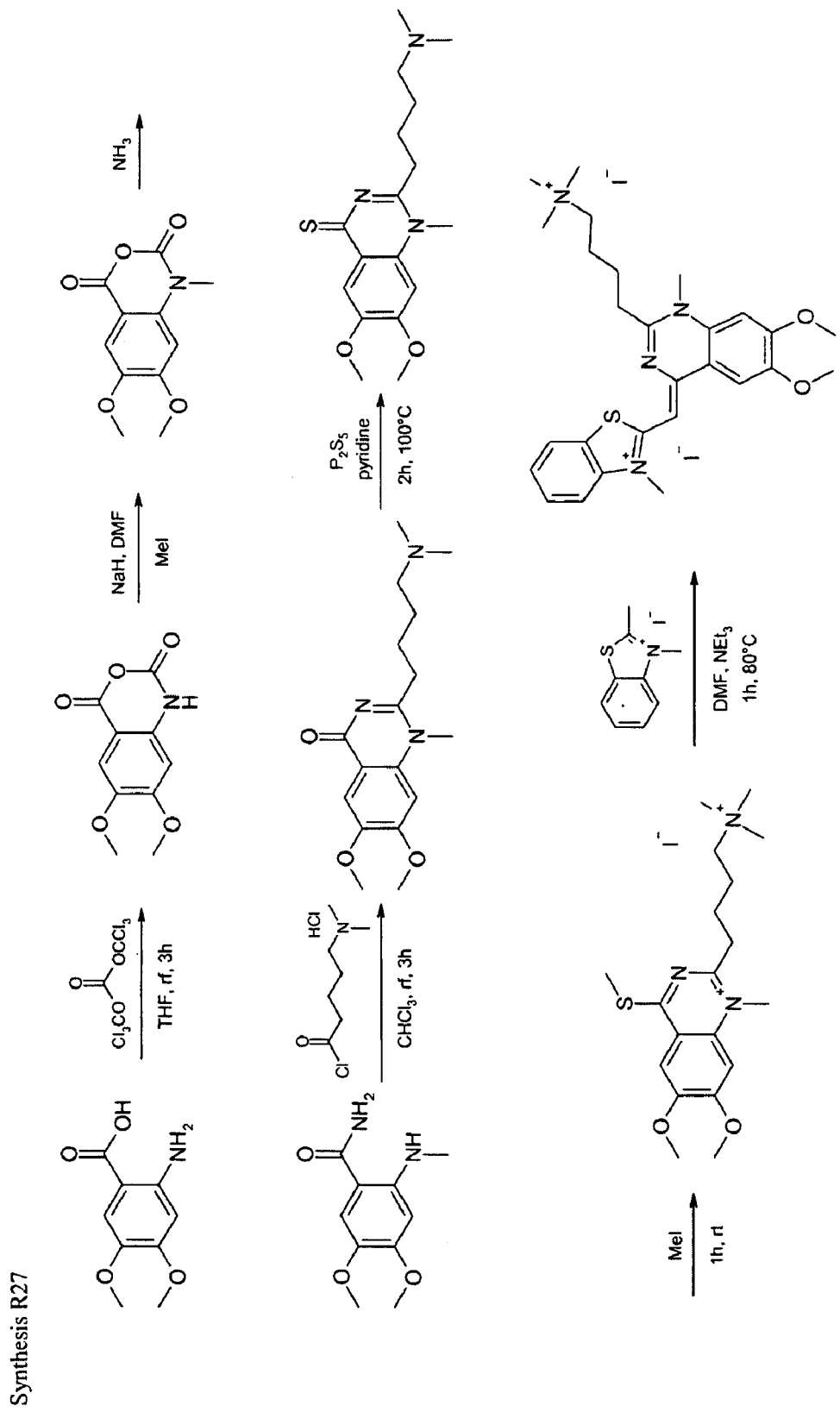
Figure 8:
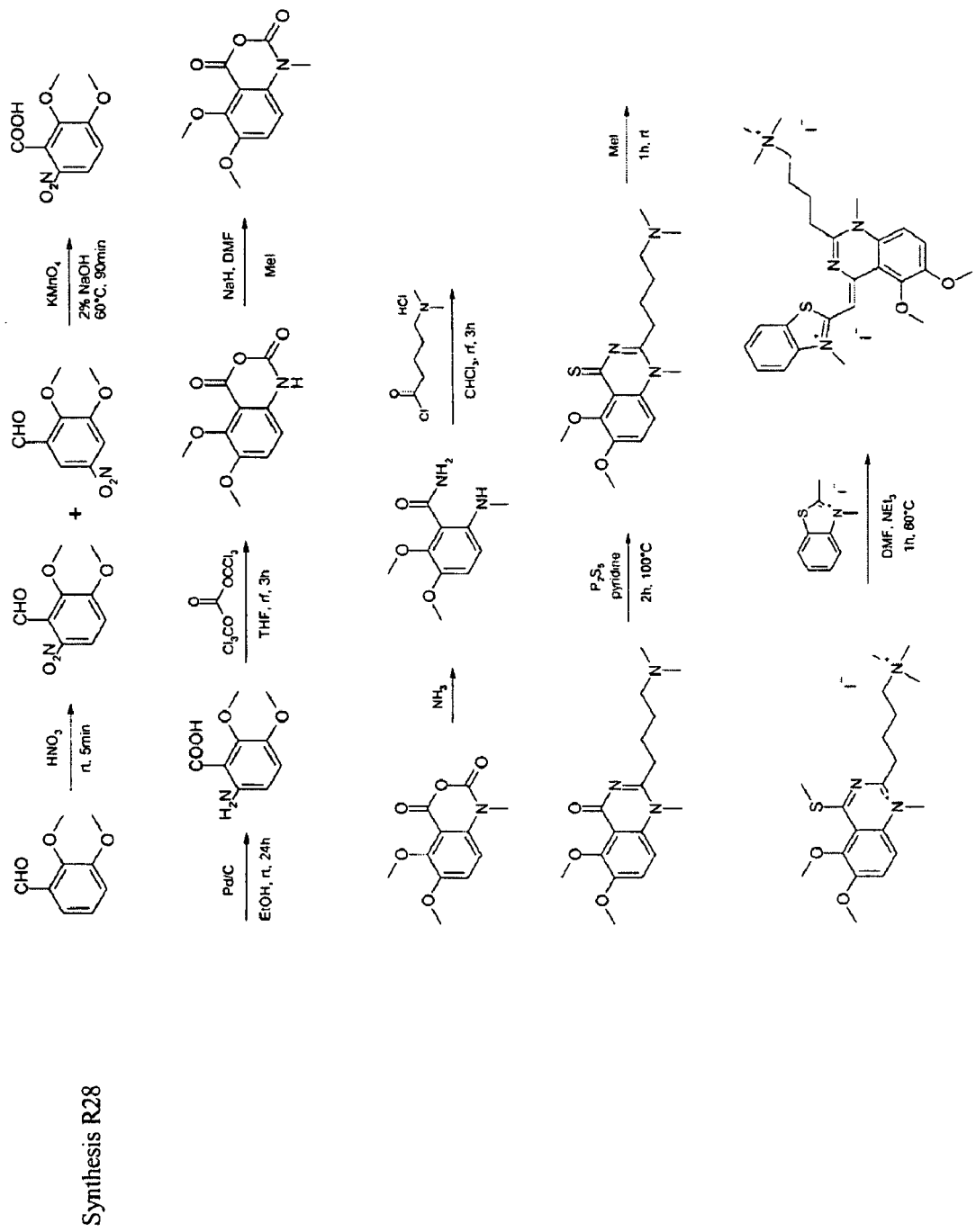

The present invention is directed to a fluorescent dye having the formula

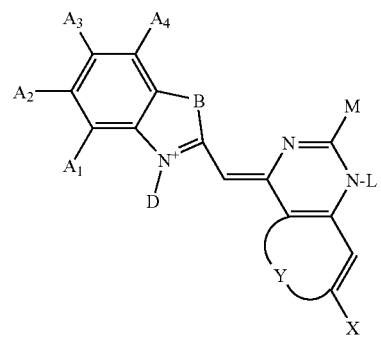

characterized in that either all of A1, A2, A3 and A4 are H or one of A1, A2, A3 and A4 is a substituent which is preferably a Halogenyl, and the others are H B is selected from a group consisting of S, O, N—R, and C—$(R)_2$ wherein R is $C_1$-$C_6$-alkyl D is either an unsubstituted or a substituted $C_1$-$C_6$ alkyl X is either H or a methoxy-group Y is selected from a group consisting of S, O, N—R wherein R is $C_1$-$C_6$-alkyl, and Z1-C=C—2, wherein Z1 and Z2 independently from each other are either H or a methoxy-group L is either $CH_3$ or phenyl M is either phenyl or a substituted or unsubstituted $C_1$-$C_{18}$ amino-alkyl.

One important feature of such a fluorescent dye comprising a benzothiazolium moiety and a pyrimidinium moiety connected by a mono-methine bridge is that the 2-position of the pyrimidine carries a substituent which starts with a C-atom. As a consequence, such a fluorescent compounds has an increased thermal and chemical stability as compared to other fluorescent dyes known in the art.

A second important feature is that the 5- and 6-positions of the pyrimidine ring are an integral part of a further aromatic ring structure. Together these two ring structures form a Quinazoline or in some embodiment other heterocyclic structures. As a consequence, the excitation and emission spectra of the fluorescent compound are different from those disclosed in WO 04/38038 and US 2005/233335, but similar to that of SYBRGreen. Thus, the compounds of the present invention can be detected by the same detection channels which are explicitly configured for the detection of SYBRGreen. Furthermore, within a given frame, said emission spectra may be modulated by choosing the one or other alternative from the X and Y substituents of said compound.

Preferably, only one representative of A1, A2, A3 and A4 is a substitution. Also preferably, such a substitution is a Halogenyl, which is most preferably a fluoro atom. Also highly preferably, B is a Sulphur atom.

In cases, wherein the fluorescent compound shall be used as a dye which is not conjugated to a second chemical moiety, D is a methyl group or another $C_2$-$C_6$ alkyl group. However, in cases, where the fluorescent compound of the present invention shall be connected to a second chemical entity, D is D is either —(CH2)n-COOH or —(CH2)n-CO—O Succinimid, characterized in that n is a natural number between 1 and 6. Preferably for these cases n is either 3 or 4. The fluorescent compound can then be bound via the respective groups to any kind of other molecule, and in particular to biomolecules. For example, such a compound may be bound to the 5' end of an oligonucleotide. The resulting conjugate may then act as a hybridization probe which after appropriate excitation emits fluorescence only when said oligonucleotide has been hybridized to a complementary target nucleic acid sequence.

In one embodiment, L is a phenyl and M is a substituted or unsubstituted $C_1$-$C_{18}$ amino-alkyl. Alternatively, M is a phenyl and L is a methyl group. Still alternatively, L is a methyl group and M is a substituted or unsubstituted $C_1$-$C_{18}$ amino-alkyl. Embodiments wherein L and M are phenyl are less preferred, because these molecules tend to have less DNA intercalating properties. In particular, M may be —(CH$_2$)n-N$^+$—(CH$_3$)$_3$, wherein n is a natural number between 1 and 18.

The additional aromatic ring structure connected to the pyrimidine via its 5- and 6-position (as defined within the pyrimidine itself) in one embodiment is a phenylen ring, such that a Quinazoline is formed. This phenylen ring may be substituted with one or two methoxy groups at position 6 and/or 7 of the Quinazoline ring system.

In another embodiment, the aromatic ring structure is a penta-heterocycle having a sulphur atom forming a thieno[3,2-d]pyrimidine.

Furthermore, when such compounds according to the invention are present in solid status, the preferred counter-ion is a halogen such as iodine or chloride.

Highly preferred are compounds are having the following structures:

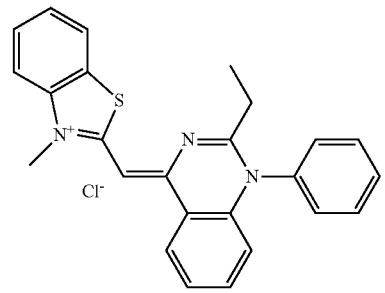

R03

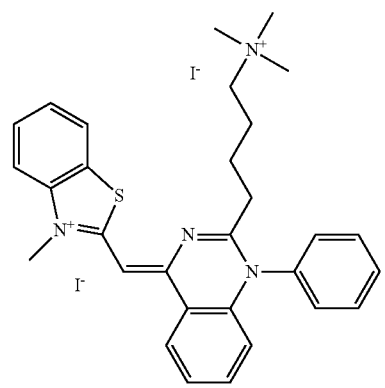

R04

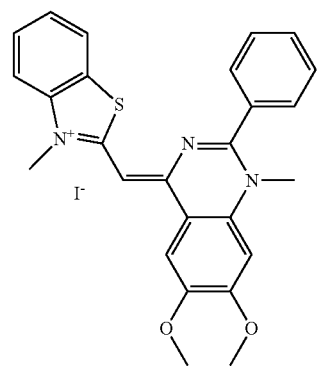

R11

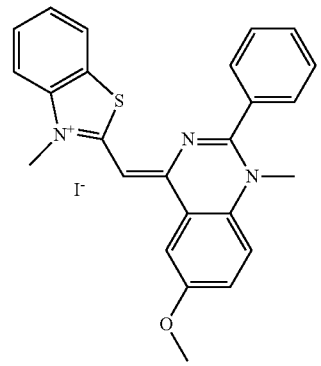

R12

R13

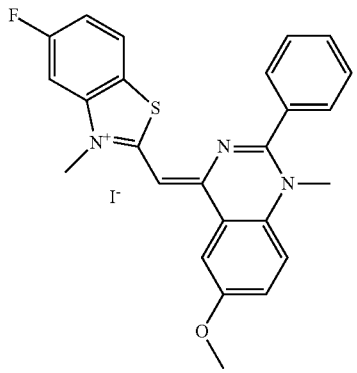

R14

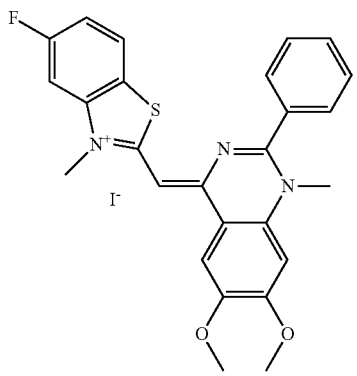

R26

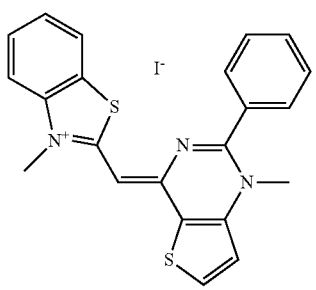

R27

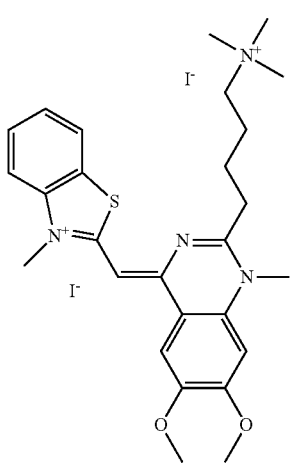

R28

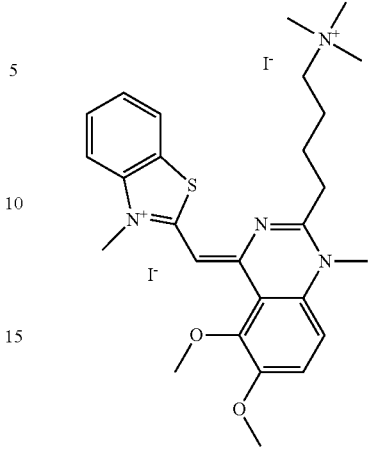

Methods According to the Present Invention

All the disclosed compounds according to the invention can be synthesized in a particular method according to the present invention. Thus, the present invention is also directed to a method for preparing a fluorescent dye according to claim 1 comprising the steps of a) providing a chemical substance having the formula

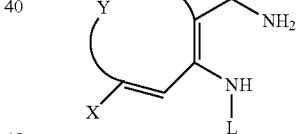

characterized in that

X is either H or a methoxy-group

Y is selected from a group consisting of S, O, N—R, wherein R is $C_1$-$C_6$-alkyl, and Z1-C=C—2, wherein Z1 and Z2 independently from each other are either H or a methoxy-group L is either $CH_3$ or phenyl b) reacting said substance with a substituted acidic chloride in order to generate a 1,4-Dihydropyrimidin-4-one derivative c) reacting said 1,4-Dihydropyrimidin-4-one derivative with a thionlytion reagent in order to generate a 1,4-Dihydropyrimidin-thione derivative d) reacting said 1,4-Dihydropyrimidin-thione derivative with Iodomethane in order to generate a 4-Methylthio-pyrimidine derivative e) reacting said 4-Methylthio-pyrimidine derivative with a compound having the formula

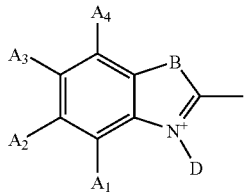

characterized in that
either all of A1, A2, A3 and A4 are H or one of A1, A2, A3 and A4 is a substituent which is preferably a Halogenyl, and the others are H
B is selected from a group consisting of S, O, N—R, and C—(R)$_2$ wherein R is $C_1$-$C_6$-alkyl
D is either a substituted or unsubstituted $C_1$-$C_6$ alkyl.

In the context of the present invention, a thionation reagent is defined as a reagent which turns a carbonyl group into a thiocarbonyl group. Preferably, such a reagent is a Lawesson reagent (FLUKA catalogue).

More precisely, the inventive method can be disclosed as follows:

Starting materials for the synthesis of the new ds DNA binding dyes are generally ortho amino-carboxy aromatic compounds, which are either commercially available or can be synthesized according to standard procedures described in the literature. These aromatic compounds can consist of aryl and hetero-aryl ring structures which may be further substituted in addition to the amino and carboxy function at certain ring positions. Preferred compounds in the light of this invention are 2-amino benzoic acid or further substituted 2-aminobenzoic acids, and especially derivatives carrying one or two methoxy groups. Preferred heteroaromatic ortho amino-carboxylic acids have a five membered ring structure, possessing a sulfur-, oxygen- or a nitrogen-atom like it is the case in thiophene, furan and pyrrole. The preferred position of the ortho amino-carboxylic groups is a 3-amino-2-carboxy substitution.

The amino group of the ortho amino-carboxy aromatic compounds might either possess a second substituent or one of the hydrogen atoms is substituted in a later step of the synthesis of the new dyes. These substituents might comprise alkyl chains or are aryl compounds. Especially preferred are methyl or phenyl.

If the aromatic compounds with ortho amino-carboxy groups already possess the appropriate substituent at the amino group these can directly be reacted further to an amide by activation to an acid chloride, for example using thionyl chloride, or oxalyl dichloride, or other standard methods, and reacting further with ammonia to the amide. For example, N-phenylanthralinic acid can be transformed to N-phenylanthralinic amide with the method as disclosed.

In case the aromatic compounds with ortho amino-carboxy groups need to be substituted further at the amino group, the procedure is as follows: at first a reaction for example with ethyl chloroformate, phosgene, diphosgene, or triphosgene is carried out to form a benz-3H-(1,3)oxazine-2,6-dione, a substituted benz-3H-(1,3)oxazine-2,6-dione or a heterocyclo-3H-(1,3)oxazine-2,6-dione. The nitrogen in the benz-3H-(1,3)oxazine-2,6-dione or a substituted benz-3H-(1,3)oxazine-2,6-dione or heterocyclo-3H-(1,3)oxazine-2,6-dione can be substituted by the following alkylation procedure. First a deprotonation using a strong base is carried out, like for example sodium hydride and the thereof formed anion reacts with an alkyl halide, or an alkyl compound with other leaving groups like for example tosylate to form a benz-3-alkyl-3H-(1,3)oxazine-2,6-dione, a substituted benz-3-alkyl-3H-(1,3)oxazine-2,6-dione or a heterocyclo-3-alkyl-3H-(1,3)oxazine-2,6-dione. Especially preferred is the reaction with iodomethane to benz-3-methyl-3H-(1,3)oxazine-2,6-dione, a substituted benz-3-methyl-3H-(1,3)oxazine-2,6-dione or a heterocyclo-3-methyl-3H-(1,3)oxazine-2,6-dione.

In a third step the benz-3-alkyl-3H-(1,3)oxazine-2,6-dione, substituted benz-3-alkyl-3H-(1,3)oxazine-2,6-dione or heterocyclo-3-alkyl-3H-(1,3)oxazine-2,6-dione is reacted with ammonia to give a 2-alkylamino-benzamide, a substituted 2-alkylaminobenzamide, or a 3-alkylmethyl-2-carboxylic acid amide heterocyclic compound, especially a thiophene, furan, or pyrrole derivative.

The thus prepared phenylen-, substituted phenylene, or heterocyclic-ortho aryl- or alkylamino carboxylic acid amides can be transformed to the appropriate 1H-quinazolin-4-one derivatives, or the 1H-pyrimidin-4-one derivatives with a condensed 5-membered heterocyclic ring structure by a reaction with alkyl-, or aryl acid chlorides or substituted alkyl-, aryl carboxylic acid chlorides. Instead of carboxylic acid chlorides other reagents can be applied such as anhydrides, mix anhydrides or aldehydes with subsequent oxidation with potassium permanganate. In the case of e.g. substituted alkyl carboxylic acid chlorides the substituent can consist of aminogroups or alkylated aminogroups, or a precursor which can be transformed to a amino group, like for example a halide which can react with ammonia or substituted amines to form a primary, secondary, tertiary or quaternary amine in the side chain at the position 2.

In the next step the carbonyl function of the 1H-quinazolin-4-one derivative, or the 1H-pyrimidin-4-one derivative with a condensed 5-membered heterocyclic ring structure is reacted further e.g. with phosphorous pentasulfide or Lawesson's reagent to yield the 1H-quinazolin-4-thion derivatives, or the 1H-pyrimidin-4-thion one derivatives with a condensed 5-membered heterocyclic ring structure.

In the next step the 1H-quinazolin-4-thion derivatives, or the 1H-pyrimidin-4-one derivatives with a condensed 5-membered heterocyclic ring structure, like thieno, faro, or pyrrolo are methylated with iodomethane or other reagents like e.g. dimethylsulfate to give the 2-alkyl/substituted alkyl/ or aryl-4-methylsulfanyl-1-alkyl/or aryl-quinazolin-1-ium salt, or the 2-alkyl/substituted alkyl/or aryl-4-methylsulfanyl-1-alkyl/or aryl-thieno(3,2-d)pyrimidin-1-ium or the analogous furo or pyrrolo derivative.

Finally these compounds are reacted with 3-alkyl-2-methyl-benzothiazol-3-ium iodine or further substituted 3-alkyl-2-methyl-benzothiazol-3-ium iodine under basic conditions, which are commercially available or can be synthesized according to published procedures, to yield the new ds DNA binding dyes. The counter ion can be varied according to the reagents applied for the alkylation at the position 3 of the 2-methyl-benzthiazol or exchanged in the final product.

Applications of the Fluorescent Compounds According to the Present Invention

The compounds of the present invention may be used for a variety of different applications. Most important, the compounds can be used in order to detect double stranded nucleic acids. Since some asymmetric carbocyanine dyes are known to intercalate into double stranded nucleic acids such as double stranded DNA and/or bind into the minor groove of a DNA double helix, there is evidence that the mode of binding double stranded DNA by the compounds of the present invention is similar if not identical.

In one embodiment, the compounds according to the present invention are used for detection of double stranded nucleic acids in the matrix of a gel wherein double stranded nucleic acids have been subjected to Gel Electrophoresis. First, a nucleic acid gel electrophoresis is performed in either an agarose gel or in an acryl amide gel according to standard methods known in the art. Subsequently, said gel is then incubated preferably during continuous gentle shaking in an aqueous solution containing 0.2 to 1.5 µg/ml of a compound as disclosed above. Preferably, a concentration of 0.7 µg/ml is being used.

In another embodiment, the compounds according to the present invention are used for detection of double stranded nucleic acids during a nucleic acid amplification reaction in real time. In this context, the inventive compound is part of a PCR reaction mixture and it is present already at the beginning of the amplification reaction. As it has been shown by the inventors, the inventive compounds do not interfere with the efficiency of such a PCR amplification reaction.

Therefore, a mixture according to the present invention comprises at least
    a compound according to the present invention as disclosed
        above
    a thermostable DNA Polymerase
    a mix of deoxynucleoside triphosphates which is usually
        dA, dG, dC and dT, or dA, dG, dC and dU, and
    a buffer.

When suitable for amplification of one or more specific nucleic acid target sequence(s), such a PCR reaction mixture comprise
    a compound according to the present invention
    a thermostable DNA Polymerase
    a mix of deoxynucleoside triphosphates which is usually
        dA, dG, dC and dT or dA, dG, dC and dU,
    a buffer, and
    at least one pair of amplification primers.

Said pair of amplification primers is designed to amplify a specific sequence of interest according to standard methods known in the art of molecular biology.

Furthermore, when brought into contact with a sample that shall be analyzed, such a PCR reaction mixture comprises
    a compound according to the present invention
    a thermostable DNA Polymerase
    a mix of deoxynucleoside triphosphates which is usually
        dA, dG, dC and dT or dA, dG, dC and dU,
    a buffer,
    at least one pair of amplification primers
    an at least partially purified nucleic acid which putatively
        comprises a specific sequence of interest.

Said partially purified nucleic acid is preferably total genomic DNA or alternatively total cellular RNA or total cellular mRNA. In case of RNA, the thermostable DNA polymerase is a DNA polymerase or a mixture of DNA polymerases comprising reverse transcriptase activity.

The concentrations of all reagents included are roughly known to persons skilled in the art and can be optimized for specific adaptations according to standard protocols. The concentration of the fluorescent compound according to the present invention is from 0.1 to 10.0 µg/ml, and preferably 0.6 µg/ml.

In a further embodiment, the compounds according to the present invention are used for detection of double stranded nucleic acids during a melting curve analysis as disclosed for other compounds known in the art. More precisely, a double stranded DNA fragment is subjected to a thermal gradient in the presence of a compound according to the present invention. Preferably, the gradient is a continuous gradient, but step gradients are also possible. Most preferably, the gradient is a linear gradient. In one particular embodiment, the sample is subjected to a temperature increase which results in the generation of a dissociation curve. In another embodiment, the double stranded target molecule is first thermally denatured into single strands and temperature dependence of fluorescence is monitored during subsequent renaturation.

The concentration of the fluorescent compound according to the present invention for a melting curve analysis is from 0.1 to 10.0 µg/ml, and preferably 0.6 µg/ml.

Preferably the double stranded DNA fragment that shall become analyzed is derived from a PCR amplification reaction. In addition, monitoring of amplification in real time can be monitored using a compound according to the invention and can be followed by subsequent melting curve analysis using said compound. Preferably, such a process is done homogenously without an intermediate opening of the reaction vessel.

Alternatively, it is possible to mix the complements of two different variants of a sequence originating from two different samples prior to the melting curve experiment itself. In a first step, the two double stranded DNAs are mixed and thermally denatured into single strands. Subsequent temperature decrease results in the formation of mixed double stranded hybrids. Variations in the sequences of the two original DNAs result in mismatches which further result in a lower melting temperature of the generated mixed hybrids. These mismatches are then detected by means of monitoring temperature dependence of fluorescent signaling during the subsequent temperature increase.

Still alternatively, it is possible to add a single stranded nucleic acid probe in excess molar concentration to a double stranded nucleic acid sample such as a PCR amplicon. In this case, the melting curve measures the melting behavior of the probe/amplicon complex. In case of mismatches between the probe and the target, lower melting temperatures are observed.

Furthermore, it is possible to use an oligonucleotide hybridization probe for melting curve analysis characterized in that a fluorescent compound according to the present invention is covalently linked to said hybridization probe. Upon hybridization of said probe, an at least partially double stranded structure is generated and fluorescent signaling from the fluorescent compound is being monitored.

The following examples and figures are provided to aid the understanding of the present invention, the true scope of which is set forth in the appended claims.

SPECIFIC EMBODIMENTS

Example 1

Synthesis of R03

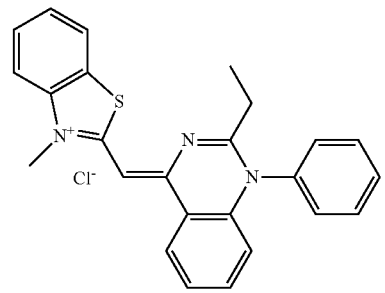

R03

1) 2-Phenylamino-benzamide 10 g (46.9 mmol) N-phenylanthranilic acid were dissolved in 100 ml toluene and 8.37 g (5.10 ml, 70.3 mmol) thionyl chloride was added. The mixture was boiled for 30 minutes, evaporated and the red residue was added to 30 ml conc. ammonia. The suspension was stirred overnight, filtrated and crystallized from a mixture of ethyl acetate/methanol.

Yield: 6.0 g=60% yellow-orange powder

2) 2-Ethyl-1-phenyl-1H-quinazolin-4-one 2.0 g (9.42 mmol) 2-phenylamino-benzamide were dissolved in 30 ml trichloromethane the solution was cooled to 0° C., and 2.61 g (2.44 ml, 28.2 mmol) propionyl chloride was added slowly. The mixture was boiled for 90 minutes and afterwards neutralized with a saturated sodium bicarbonate solution. After evaporation the substance was crystallized from isopropanol.

Yield: 1.85 g=78% yellow powder

3) 2-Ethyl-1-phenyl-1H-quinazolin-4-thione 1.50 g (5.99 mmol) 2-ethyl-1-phenyl-1H-quinazolin-4-one and 2.42 g (5.99 mmol) Lawesson's reagent ($C_{14}H_{14}O_2P_2S_4$, Fluka) were suspended in 40 ml toluene and boiled for 1 h. After evaporation the crude mixture was purified by column chromatography on silica gel, eluent dichloromethane/acetone 95/5.

Yield: 1.36 g=85% orange powder

4) 2-Ethyl-4-methylsulfanyl-1-phenyl-quinazolin-1-ium 1.0 g (3.72) 2-ethyl-1-phenyl-1H-quinazolin-4-thione was added to 15 ml iodomethane and stirred for 1 h. The mixture was filtrated and washed with ethyl ether.

Yield: 1.0 g=65%

5) 2,3-Dimethyl-benzothiazol-3-ium iodide 14.9 g (12.7 ml, 0.10 mol) 2-methyl-benzothiazole and 28.4 g (12.5 ml, 0.20 mol) iodomethane were boiled for 7 h in 20 ml ethanol. The residue was filtrated and washed with ethanol.

Yield: 17.0 g=58% colorless powder.

6) 2-(2-Ethyl-1-phenyl-1H-quinazolin-4-ylidenemethyl)-3-methyl-benzothiazol-3-ium chloride 400 mg (1.37 mmol) 2,3-dimethyl-benzothiazol-3-ium iodide and 559 mg (1.37 mmol) 2-ethyl-4-methylsulfanyl-1-phenyl-quinazolin-1-ium were dissolved in 10 ml dimethylformamide and 554 mg (0.76 ml, 5.47 mmol) triethylamine was added. The mixture was stirred for 1 h at 80° C. The residue was filtrated and washed with hydrochloric acid (10%).

Yield: 250 mg=42%

Example 2

Synthesis of R04

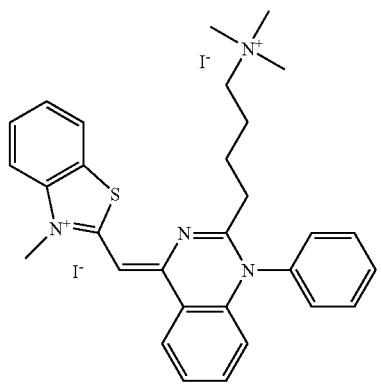

1) 2-(3-Dimethylamino-butyl)-1-phenyl-1H-quinazolin-4-one 3.80 g (20.9 mmol) dimethylamino-pentanoic acid were added to 25 ml thionyl chloride and stirred for 90 min. at 55-60° C. The remaining thionyl chloride was distilled in vacuum and the residue was added to a solution of 2.00 g (9.42 mmol) 2-phenylamino-benzamide (see above) in 30 ml trichloromethane at 0° C. The reaction mixture was boiled for 4 h and stirred overnight at room temperature. The residue was filtrated and dissolved in dichloromethane and saturated sodium bicarbonate solution. The organic solvent was dried over magnesium sulfate and evaporated. The yellow oil slowly crystallized.

Yield: 1.90 g=63% yellow crystals

2) 2-(3-Dimethylamino-butyl)-1-phenyl-1H-quinazolin-4-thione 550 mg (1.71 mmol) 2-(3-Dimethylamino-butyl)-1-phenyl-1H-quinazolin-4-one were dissolved in 10 ml pyridine and 445 mg (2.00 mmol) phosphorous pentasulfide were added. The reaction mixture was boiled for 90 min. After evaporation of the solvent the residue was dissolved in dichloromethane and washed with 2 N sodium hydroxide solution. The organic solution was dried with magnesium sulphate and evaporated. The crude product was further purified by column chromatography on silica, eluent dichloromethane/methanol/triethylamine 9/1/0.1.

Yield: 375 mg=65% yellow-orange powder

3) 2-(4-Trimethylammonium-butyl)-4-methylsulfanyl-1-phenyl-quinazolin-1-ium diiodide 300 mg (0.89 mmol) 2-(3-Dimethylamino-butyl)-1-phenyl-1H-quinazolin-4-thione were dissolved in 5 ml iodomethane and stirred for 1 h at room temperature. The mixture was filtrated and the residue rinsed with ethyl ether and dichloromethane.

Yield: 370 mg=845 yellow powder

4) 2-(2-(4-Trimethylammonium-butyl)-1-phenyl-1H-quinazolin-4-ylidenemethyl)-3-benzothiazol-3-ium iodide 300 mg (0.48 mmol) 2-(4-Trimethylammonium-butyl)-4-methylsulfanyl-1-phenyl-quinazolin-1-ium diiodide and 177 mg (0.61 mmol) 2,3-Dimethyl-benzothiazol-3-ium iodide were dissolved in 2 ml dimethylformamide and 247 mg (0.34 ml, 2.44 mmol) triethylamine were added. The suspension was stirred for 1 h at 80° C., filtrated and rinsed with water, dichloromethane and methanol.

Yield: 350 mg=100% red powder

Example 3

Synthesis of R11

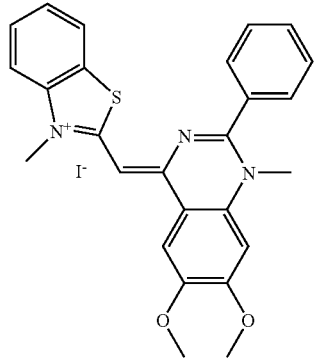

1) 6,7-Dimethoxy-1H-benzo(d)(1,3)oxazine-2,4-dione 10.0 g (50.7 mmol) 2-Amino-4,5-dimethoxy-benzoic acid were dissolved in 150 ml tetrahydrofuran. 6.52 g (22.0 mmol) triphosgene were added and the solution was boiled for 3 h. After equilibration to room temperature the reaction mixture was poured on a water/ice mixture. The residue was filtrated and rinsed with methanol.

Yield: 8.7 g=86% grey powder

2) 6,7-Dimethoxy-1-methyl-1H-benzo(d)(1,3)oxazine-2,4-dione 9.00 g (40.3 mmol) 6,7-Dimethoxy-1H-benzo(d)(1,3)oxazine-2,4-dione were dissolved in 60 ml dried dimethylformamide and cooled to 0° C. 1.32 g (52.3 mmol) sodium hydride was added and the solution was stirred for 30 min at room temperature (Argon). After cooling to 0° C. again 7.42 g (3.27 ml, 52.3 mmol) iodomethane was added and stirred at room temperature for 1 h. 300 ml water was added and the residue is filtrated, rinsed with water and ethyl ether.

Yield: 8.5 g=89% grey powder

3) 4,5-Dimethoxy-2-methylamino-benzamide 2.40 g (10.1 mmol) 6,7-Dimethoxy-1-methyl-1H-benzo(d)(1,3)oxazine-2,4-dione were dissolved in 30 ml tetrahydrofuran and 15.0 ml ammonia (25%) added at 0° C. The solution was stirred for 30 min at 0° C. and for 30 min at room temperature. THF was distilled under vacuum and the remaining suspension was neutralized with diluted hydrogen chloride acid. The product was isolated by filtration.

Yield: 2.00 g=94% grey powder.

4) 6,7-Dimethoxy-1-methyl-2-phenyl-1H-quinazolin-4-one 2.00 g (9.51 mmol) 4,5-Dimethoxy-2-methylamino-benzamide were dissolved in 20 ml dichloromethane and 4.01 g (3.31 ml, 28.5 mmol) benzoyl chloride are added. The mixture was boiled for 90 min. After filtration the residue was dissolved in trichloromethane and saturated sodium bicarbonate solution. The organic solution was dried over magnesium sulfate and evaporated under vacuum.

Yield: 2.30 g=82% yellow powder

5) 6,7-Dimethoxy-1-methyl-2-phenyl-1H-quinazolin-4-thione 1.50 g (5.06 mmol) 6,7-Dimethoxy-1-methyl-2-phenyl-1H-quinazolin-4-one and) 2.00 g (4.94 mmol) Lawesson's reagent ($C_{14}H_{14}O_2P_2S_4$, Fluka) were dissolved in 20 ml toluene. The reaction mixture was boiled for 2 h. After evaporation the residue was further purified by column chromatography with silica, eluent dichloromethane/acetone 95/5.

Yield: 1.25 g=79% orange powder

6) 6,7-Dimethoxy-1-methyl-4-methylsulfanyl-2-phenyl-quinazolin-1-ium iodide 1.00 g (3.20 mmol) 6,7-Dimethoxy-1-methyl-2-phenyl-1H-quinazolin-4-thione was slowly added to 5 ml (80 mmol) iodomethane at 0° C. and stirred for 1 h at room temperature. The solution was filtrated and the residue washed with ethyl ether and dichloromethane.

Yield: 1.20 g==82% yellow powder

7) 2-(6,7-Dimethoxy-1-methyl-2-phenyl-1H-quinazolin-4-ylidenemethyl)-3-methyl-benzothiazol-3-ium iodide 500 mg (1.10 mmol) 6,7-Dimethoxy-1-methyl-4-methylsulfanyl-2-phenyl-quinazolin-1-ium iodide and 320 mg (1.10 mmol) 2,3-Dimethyl-benzothiazol-3-ium iodide were dissolved in 200 ml dimethylformamide and 445 mg (0.61 ml, 4.40 mmol) triethylamine were added. The solution was stirred for 1 h at 80° C., filtrated and the residue is washed with water and methanol.

Yield: 450 mg=72% orange red powder

Example 4

Synthesis of R12, R13 and R14

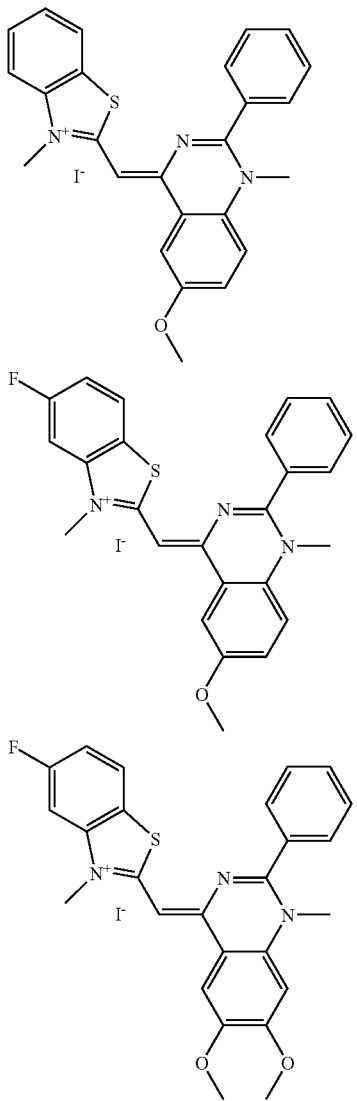

R12

1) 6-Methoxy-1H-benzo(d)(1,3)oxazine-2,4-dione 5.00 g (21.6 mmol) 2-Bromo-5-methoxy-benzoic acid, 620 mg (4.32 mmol) copper (I) bromide and 2.63 g (32.4 mmol) potassium cyanate were dissolved in pyridine and boiled for 30 min. The solvent was removed and the residue was dissolved in 150 ml 2N hydrogen chloride acid and 150 ml ethyl acetate. The organic solvent was treated with water and brine, dried over magnesium sulfate and removed. The residue was digested with methanol.

Yield: 2.50 g=61% grey powder

2) 6-Methoxy-1-methyl-1-benzo(d)(1.3)oxazine-2,4-dione 2.00 g (10.4 mmol) 6-Methoxy-1H-benzo(d)(1,3)oxazine-2,4-dione were dissolved in dried dimethylformamide and cooled to 0° C. 324 mg (13.5 mmol) sodium hydride was slowly added (Argon) and the mixture was stirred for 30 min at room temperature. After cooling again to 0° C. 1.92 g (0.85 ml, 13.5 mmol) iodomethane were added. After stirring for 1 h at room temperature the residue was filtrated and washed with water and ethyl ether.

Yield: 1.62 g=75% grey powder

3) 5-Methoxy-2-methylamino-benzamide 1.50 g (7.24 mmol) 6-Methoxy-1-methyl-1H-benzo(d)(1,3)oxazine-2,4-dione were dissolved in 20 ml tetrahydrofuran and 10.0 ml ammonia (25%) added at 0° C. The solution was stirred for 30 min at 0° C. and for 30 min at room temperature. THF was distilled under vacuum and the remaining suspension was neutralized with diluted hydrogen chloride acid. The product was isolated by filtration.

Yield: 1.00 g=77% brown powder.

4) 6-Methoxy-1-methyl-2-phenyl-1H-quinazolin-4-one 1.00 g (5.55 mmol) 5-Methoxy-2-methylamino-benzamide were dissolved in 25 ml trichloromethane and 2.34 g (1.93 ml, 16.6 mmol) benzoyl chloride were added. The mixture was boiled for 90 min. After filtration the residue was dissolved in trichloromethane and saturated sodium bicarbonate solution. The organic solution was dried over magnesium sulfate and evaporated under vacuum.

Yield: 1.30 g=88% yellow powder

5) 6-Methoxy-1-methyl-2-phenyl-1H-quinazolin-4-thione 1.20 g (4.51 mmol) 6-Methoxy-1-methyl-2-phenyl-1H-quinazolin-4-one and 1.82 g (4.50 mmol) Lawesson's reagent ($C_{14}H_{14}O_2P_2S_4$, Fluka) were dissolved in 20 ml toluene. The reaction mixture was boiled for 3 h. After evaporation the residue was further purified by column chromatography with silica, eluent dichloromethane/acetone 95/5.

Yield: 1.20 g=94% orange powder

6) 6-Methoxy-1-methyl-4-methylsulfanyl-2-phenyl-quinazolin-1-ium iodide 1.00 g (3.54 mmol) 6-Methoxy-1-methyl-2-phenyl-1H-quinazolin-4-thione was slowly added to 5 ml (80 mmol) methyl iodide at 0° C. and stirred for 1 h at room temperature. The solution was filtrated and the residue washed with ethyl ether and dichloromethane.

Yield: 1.25 g=83% yellow powder

7) 2-(6-Methoxy-1-methyl-2-phenyl-1H-quinazolin-4-ylidenemethyl)-3-methyl-benzothiazol-3-ium iodide 600 mg (1.41 mmol) 6-Methoxy-1-methyl-4-methylsulfanyl-2-phenyl-quinazolin-1-ium iodide and 412 mg (1.41 mmol) 2,3-dimethyl-benzothiazol-3-ium iodide were dissolved in 2.0 ml dimethylformamide and 571 mg (0.79 ml, 5.64 mmol) triethylamine were added. The solution was stirred for 1 h at 80° C., filtrated and the residue was washed with water and methanol.

Yield: 650 mg=85% red powder

R13

1) 5-Fluoro-2,3-dimethyl-benzothiazol-3-ium iodide 13.0 g (10.4 ml, 77.7 mmol) 5-Fluoro-2-methyl-benzothiazole and 22.1 g (9.47 ml, 156 mmol) iodomethane were boiled in ethanol for 7 h. The residue was filtrated. 4.00 g=17% white powder

2) 5-Fluoro-2-(6-methoxy-1-methyl-2-phenyl-1H-quinazolin-4-ylidenemethyl)-3-methyl-benzothiazol-3-ium iodide 600 mg (1.41 mmol) 6-Methoxy-1-methyl-4-methylsulfanyl-2-phenyl-quinazolin-1-ium iodide and 436 mg (1.41 mmol) 5-fluoro-2,3-dimethyl-benzothiazol-3-ium iodide were dissolved in 3.0 ml dimethylformamide and 571 mg (0.79 ml, 5.64 mmol) triethylamine were added. The solution was stirred for 1 h at 80° C., filtrated and the residue was washed with water and methanol.
Yield: 600 mg=76% orange red powder

R14

1) 2-(6,7-dimethoxy-1-methyl-2-phenyl-1H-quinazolin-4-ylidenemethyl)-5-fluoro-3-methyl-benzothiazol-3-ium iodide 500 mg (1.10 mmol) 6,7-Dimethoxy-1-methyl-4-methylsulfanyl-2-phenyl-quinazolin-1-ium iodide
(see above) and 340 mg (1.10 mmol) 5-fluoro-2,3-dimethyl-benzothiazol-3-ium iodide were dissolved in 3.0 ml dimethylformamide and 445 mg (0.61 ml, 4.40 mmol) triethylamine were added. The solution was stirred for 1 h at 80° C., filtrated and the residue was washed with water and methanol.
Yield: 400 mg=62% red powder

Example 5

Synthesis of R26

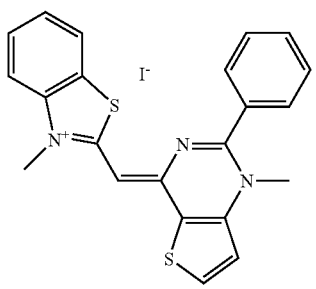

1) 1H-Thieno(3,2-d)(1,3)oxazine-2,4-dione 40 g (250 mmol) 3-Amino-thiophene-2-carboxylic acid methyl ester were suspended in 250 ml water with 21.0 g (374 mmol) potassium hydroxide. The mixture was boiled in a microwave oven (500 W) for 30 min and afterwards it was cooled to 0° C. A solution of 37.1 g (125 mmol) triphosgene in 200 ml toluene was added drop wise and the reaction mixture stirred for 2 h at room temperature. The residue was isolated by filtration. The product was washed with water and sodium bicarbonate solution. For further purification it can be washed with ethyl ether and methanol after drying.
Yield: 22 g=52%, colorless

2) 1-Methyl-1H-thieno(3,2-d)(1,3)oxazine-2,4-dione 3.60 (21.3 mmol) 1H-Thieno(3,2-d)(1,3)oxazine-2,4-dione were dissolved in dried dimethylformamide and cooled to 0° C. 664 mg (27.7 mmol) sodium hydride was slowly added (Argon) and the mixture was stirred for 30 min at 0° C. and 30 min at room temperature. After cooling again to 0° C. 3.93 g (1.73 ml, 27.7 mmol) iodomethane were added. After stirring for 1 h at room temperature 200 ml water were added. The residue was filtrated and washed with water and ethyl ether.
Yield: 2.70 g=69% beige powder

3) 3-Methylamino-thiophene-2-carboxylic acid amide 2.60 g (14.2 mmol) 1-Methyl-1H-thieno(3,2-d)(1,3)oxazine-2,4-dione were dissolved in 30 ml tetrahydrofuran and 15.0 ml ammonia (25%) were added at 0° C. The solution was stirred for 30 min at 0° C. and for 30 min at room temperature. THF was distilled under vacuum and the remaining suspension was neutralized with diluted hydrogen chloride acid. The product was isolated by filtration.
Yield: 1.76 g=79% beige powder

4) 1-Methyl-2-phenyl-1H-thieno(3,2-d)pyrimidine-4-one 1.70 g (10.9 mmol) 3-Methylamino-thiophene-2-carboxylic acid amide were dissolved in 20 ml trichloromethane and 3.82 g (3.16 ml, 22.2 mmol) benzoyl chloride were added. The mixture was boiled for 90 min. After filtration the residue was dissolved in trichloromethane and washed with saturated sodium bicarbonate solution. The organic solution was dried over magnesium sulfate and evaporated under vacuum. The crude product was purified by column chromatography on silica, eluent dichloromethane/methanol 95/5.
Yield: 2.10 g=80% white powder

5) 1-Methyl-2-phenyl-1H-thieno[3,2-d]pyrimidine-4-thione 2.10 g (8.67 mmol) 1-Methyl-2-phenyl-1H-thieno(3,2-d)pyrimidine-4-one and 3.51 g (8.67 mmol) Lawesson's reagent ($C_{14}H_{14}O_2P_2S_4$, Fluka) were dissolved in 40 ml toluene. The reaction mixture was boiled for 3 h. After evaporation the residue was further purified by column chromatography with silica, eluent dichloromethane/acetone 95/5.
Yield: 500 g=22% yellow powder

6) 1-Methyl-4-methylsulfanyl-2-phenyl-thieno(3,2-d)pyrimidin-1-ium iodide 500 mg 1-Methyl-2-phenyl-1H-thieno(3,2-d)pyrimidine-4-thione was slowly added to 5 ml (80 mmol) iodomethane at 0° C. and stirred for 1 h at room temperature. The solution was filtrated and the residue washed with dichloromethane.
Yield: 550 g=71% yellow powder

7) 3-Methyl-2-(1-methyl-2-phenyl-1H-thieno(3,2-d)pyrimidin-4-ylidenemethyl)-benzothiazol-3-ium iodide 200 mg (0.50 mmol) 1-Methyl-4-methylsulfanyl-2-phenyl-thieno(3,2-d)pyrimidin-1-ium iodide and 145 mg (0.50 mmol) 2,3-dimethyl-benzothiazol-3-ium iodide were dissolved in 2.0 ml dimethylformamide and 202 mg (0.28 ml, 2.00 mmol) triethylamine were added. The green solution was stirred for 1 h at 80° C., filtrated and the residue was washed with methanol. The crude product was purified further by HPLC.

Yield: 40 mg=15% yellow powder

Example 6

Synthesis of R27

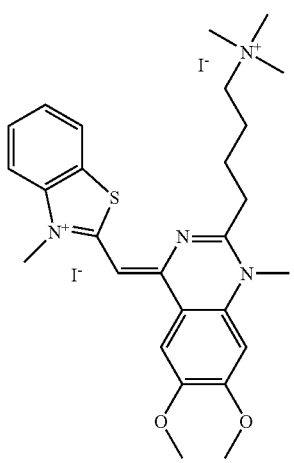

1) 2-(4-Dimethylamino-butyl)-6,7-dimethoxy-1-methyl-1H-quinazoline-4-one 3.80 g (20.9 mmol) dimethylamino-pentanoic acid were added to 25 ml thionyl chloride and stirred for 90 min. at 55-60° C. The remaining thionyl chloride was distilled in vacuum and the residue was added to a solution of 2.00 g (9.51 mmol) 4,5-Dimethoxy-2-methylamino-benzamide (see above) dissolved in 30 ml trichloromethane at 0° C. The mixture was boiled for 4 h. After filtration the residue was dissolved in trichloromethane and saturated sodium bicarbonate solution. The organic solution was dried over magnesium sulfate and evaporated under vacuum.

Yield: 400 mg=13% brownish powder 2) 2-(4-Dimethylamino-butyl)-6,7-dimethoxy-1-methyl-1H-quinazoline-4-thione 400 mg (1.25 mmol) 2-(4-Dimethylamino-butyl)-6,7-dimethoxy-1-methyl-1H-quinazoline-4-one were dissolved in 20 ml pyridine and 418 mg (1.88 mmol) phosphorous pentasulfide was added. The reaction mixture was boiled for 2 h. After evaporation of the solvent the residue was dissolved in dichloromethane and washed with 2 N sodium hydroxide solution. The organic solution was dried with magnesium sulphate and evaporated.

Yield: 310 mg=74% yellow-orange powder 3) 2-(4-Trimethylammonium-butyl)-6,7-dimethoxy-1-methyl-4-methylsulfanyl-quinazolin-1-ium diiodide 300 mg (0.89 mmol 2-(4-Dimethylamino-butyl)-6,7-dimethoxy-1-methyl-1H-quinazoline-4-thione were dissolved in 1 ml iodomethane at 0° C. and stirred for 1 h at room temperature. The mixture was filtrated and the residue rinsed with dichloromethane.

Yield: 310 mg=75% ocher powder 4) 2-(2-(4-Trimethylammonium-butyl-6,7-dimethoxy-1-methyl-1H-quinazolin-4-ylidenemethyl)-3-methyl-benzothiazol-3-ium diiodide 220 mg (0.36) 2-(4-Trimethylammonium-butyl)-6,7-dimethoxy-1-methyl-4-methylsulfanyl-quinazolin-1-ium diiodide and 104 mg (0.36 mmol) 2,3-dimethyl-benzothiazol-3-ium iodide were dissolved in 2 ml dimethylformamide and 146 mg (0.20 ml, 1.44 mmol) triethylamine were added. The suspension was stirred for 1 h at 80° C., filtrated and rinsed with dichloromethane and methanol.

Yield: 220 mg=83% red orange powder

Instead of 2,3-dimethyl-benzothiazol-3-ium iodide e.g. benzothiazolium, 3-(3-carboxypropyl)-2-methyl-, bromide (see Alfimov, M. V. et al., J. Chem. Soc., Perkin Transactions 2: Physical Organic Chemistry 7 (1996) 1441-1447) can be employed, leading to 2-(2-(4-Trimethylammonium-butyl-6,7-dimethoxy-1-methyl-1H-quinazolin-4-ylidenemethyl)-3-carboxypropyl-benzothiazol-3-ium diiodide.

Example 7

Synthesis of R28

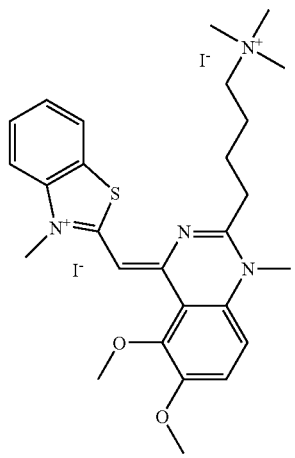

1) 2,3-Dimethoxy-6-nitro-benzaldehyd 50.0 g (301 mmol) 2,3-Dimethoxy-benzaldehyd (Aldrich) were slowly added to nitric acid at 0° C. The reaction mixture was stirred for 5 minutes, diluted with water until no further precipitate was obtained. After filtration the residue was washed with methanol.

Yield: 58.0 g=91% (5- and 6-nitro isomer) yellow powder 2) 6-Nitro-2,3-dimethoxy-benzoic acid 58.0 g (275 mmol) 2,3-Dimethoxy-6(5)-nitro-benzaldehyd were added to a solution of 45.6 g (289 mmol) potassium permanganate in 112% sodium hydroxide. The solution was stirred for 90 min at 60° C. Mangan dioxide was removed by filtration using Celite. Remaining potassium permanganate was deactivated by the addition of methanol and the mangan dioxide again removed by filtration. The solution was acidified with hydrogen chloride acid to pH 2.75. The precipitated product was filtrated, rinsed with water and a mixture water/ethanol. By acidification to pH 0.8 further product can be isolated.

Yield: 23.8 g=38% colorless powder

3) 6-Amino-2,3-dimethoxy-benzoic acid

To a solution of 23.4 g (104 mmol) 6-nitro-2,3-dimethoxy-benzoic acid in ethanol 2.5 g Pd/C were added and treated with 1 bar $H_2$ for 24 h. The catalyst was removed by filtration over Celite, the solution evaporated, the residue was dissolved in 300 ml dioxane and lyophilized.

Yield: 20.0 g=98% beige powder

4) 5,6-Dimethoxy-1H-benzo[d][1,3]oxazine-2,4-dione 10.0 g (50.7 mmol) 6-Amino-2,3-dimethoxy-benzoic acid were dissolved in 150 ml tetrahydrofuran, 6.52 g (22.0 mmol) triphosgene were added and the solution was refluxed for 3 h. After pouring on 400 ml of a ice/water mixture the precipitate was filtrated and rinsed with water and methanol.

Yield: 8.27 g=73% yellow powder

5) 5,6-Dimethoxy-1H-benzo[d]-N-methyl-[1,3]oxazine-2,4-dione 19.0 g (85.1 mmol) 5,6-Dimethoxy-1H-benzo[d][1,3]oxazine-2,4-dione were dissolved in dried dimethylformamide (100 ml) and cooled to 0° C. 2.8 g (111 mmol) sodium hydride was slowly added (Argon) and the mixture was stirred for 30 min at 0° C. and 30 min at room temperature. After cooling again to 0° C. 15.7 g (6.92 ml, 111 mmol) iodomethane were added. After stirring for 1 h at room temperature 150 ml water were added. The residue was filtrated and washed with water and ethyl ether.

Yield: 14.2 g=67% beige powder

6) 6-Methylamino-2,3-dimethoxybenzamide 14.0 g (59 mmol) 5,6-Dimethoxy-1H-benzo[d]-N-methyl-[1,3]oxazine-2,4-dione were dissolved in 180 ml tetrahydrofuran and 90 ml ammonia (25%) were added at 0° C. The solution was stirred for 30 min at 0° C. and for 30 min at room temperature. THF was distilled under vacuum and the remaining suspension was neutralized with diluted hydrogen chloride acid. The product was isolated by filtration.

Yield: 10.75 g=87% yellow powder

7) 2-(4-Dimethylamino-butyl)-5,6-dimethoxy-1-methyl-1H-quinazoline-4-one 3.80 g (20.9 mmol) Dimethylamino-pentanoic acid were added to 25 ml thionyl chloride and stirred for 90 min. at 55-60° C. The remaining thionyl chloride was distilled in vacuum and the residue was added to a solution of 2.00 g (11.1 mmol) 6-methylamino-2,3-dimethoxybenzamide dissolved in 30 ml trichloromethane at 0° C. The mixture was boiled for 2 h and stirred overnight at room temperature. After filtration the residue was dissolved in trichloromethane and saturated sodium bicarbonate solution. The organic solution was dried over magnesium sulfate and evaporated under vacuum.

Yield: 500 mg=14% oil

8) 2-(4-Dimethylamino-butyl)-5,6-dimethoxy-1-methyl-1H-quinazoline-4-thione 800 mg (2.50 mmol) 2-(4-Dimethylamino-butyl)-5,6-dimethoxy-1-methyl-1H-quinazoline-4-one were dissolved in 20 ml pyridine and 612 mg (2.75 mmol) phosphorous pentasulfide was added. The reaction mixture was boiled for 1 h. After evaporation of the solvent the residue was dissolved in dichloromethane and washed with 2 N sodium hydroxide solution. The organic solution was dried with magnesium sulphate and evaporated. The crude product was further purified by column chromatography on silica, eluent trichloromethane, methanol, triethylamine 8:2:0.2

Yield: 220 mg=26% orange-red powder

9) 2-(4-Trimethylammonium-butyl)-5,6-dimethoxy-1-methyl-4-methylsulfanyl-quinazolin-1-ium diiodide 220 mg (0.66 mmol 2-(4-Dimethylamino-butyl)-5,6-dimethoxy-1-methyl-1H-quinazoline-4-thione were dissolved in 2 ml iodomethane at 0° C. and stirred for 1 h at room temperature. The mixture was filtrated and the residue rinsed with dichloromethane.

Yield: 340 mg=83% red-brownish powder

10) 2-(2-(4-Trimethylammonium-butyl)-5,6-dimethoxy-1-methyl-1H-quinazolin-4-ylidenemethyl)-3-methyl-benzothiazol-3-ium diiodide 117 mg (0.27) 2-(4-Trimethylammonium-butyl)-5,6-dimethoxy-1-methyl-4-methylsulfanyl-quinazolin-1-ium diodide and 79 mg (0.27 mmol) 2,3-dimethyl-benzothiazol-3-ium iodide were dissolved in 2 ml dimethylformamide and 109 mg (0.15 ml, 1.08 mmol) triethylamine were added. The suspension was stirred for 1 h at 80° C., filtrated and rinsed with dichloromethane and methanol.

Yield: 100 mg=51% red-orange powder

Example 8

Use of R03, R04, R11, R12, R13, R14, R26, R27, and R28 in PCR and Melting Curve Analysis Using the dyes disclosed above, a PCR was run using the LIGHTCYCLER 480 System (Roche Diagnostics GmbH, Cat. No. 04640268001, with accessories) with primers for a specific section of the mdr-1 gene (Gene bank accession No: M29445). The primers used correspond to Position Nos: 122 (forward) and 211 (reverse). Samples of genomic DNA that is wildtype, heterocygote or homocygote for a point mutation in this sequence were analyzed.

PCR Mix:

0.5 µM forward primer mdr-1

0.5 µM reverse primer mdr-1

1 ng/µl genomic DNA

LIGHTTYPER 96 PCR Kit (Roche Diagnostics GmbH, Cat. No. 03707709001)

0.8 µM of the respective dye

Instrument Protocol:

| Setup | | |
|---|---|---|
| Detection Format | Block Type | Reaction Volume |
| SYBRGreen I (483-533), Dynamic Mode | 96 | 20 μl |

| Programs | | |
|---|---|---|
| Program Name | Cycles | Analysis Mode |
| Denaturation | 1 | None |
| Cycling | 45 | Quantification |
| Melting | 1 | Melting Curves |

| Temperature Targets | | | | |
|---|---|---|---|---|
| Target (° C.) | Acquisition Mode | Hold (hh:mm:ss) | Ramp Rate (° C./s) | Acquisitions (per ° C.) |
| Denaturation | | | | |
| 95 | None | 00:10:00 | 4.4 | — |
| Cycling | | | | |
| 95 | None | 00:00:10 | 4.4 | — |
| 60 | None | 00:00:20 | 2.2 | — |
| 72 | Single | 00:00:20 | 4.4 | — |
| Melting | | | | |
| 95 | None | 00:00:05 | 4.4 | — |
| 40 | None | 00:01:00 | 1.5 | — |
| 95 | Continuous | — | — | 50 |
| 40 | None | 00:00:30 | 1.5 | — |

With all dyes, amplification curves were successfully monitored by fluorescence measurement within a channel detecting fluorescence emission at 483-533 nm. Subsequently, the different melting behavior of the homozygous or heterozygous DNA could be monitored.

Example 9

Stability of R27

The light stability of R27, which is representative for the nine described dyes, was compared to established dyes already used for such applications. The fluorescence of a mixture of the respective dye and genomic DNA was measured during continuous light exposure. Stability of R27 turned out to be distinctly higher:

| | Light exposure [min] | | | | | |
|---|---|---|---|---|---|---|
| | 0 | 10 | 30 | 60 | 180 | 300 |
| SYBR Green I | 100% | 87% | 77% | 70% | 40% | 24% |
| LC Green Plus | 100% | 92% | 86% | 79% | 47% | 37% |
| R 27 | 100% | 99% | 98% | 99% | 97% | 96% |

Excitation of R27 solution for fluorescence measurement and repeated temperature changes between 55 and 95° C. during a typical PCR protocol on a real-time PCR instrument like the LIGHTCYCLER 480 cause no recognizable bleaching of the dye:

What is claimed is:

1. A fluorescent dye having the formula

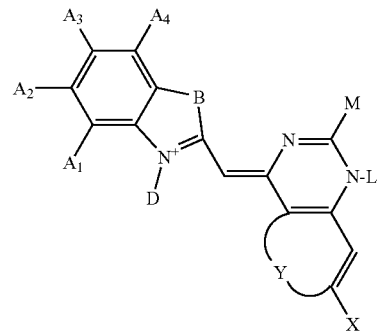

wherein all of $A_1$, $A_2$, $A_3$, and $A_4$ are H or one of $A_1$, $A_2$, $A_3$, and $A_4$ is a halogen and the others are H;

B is selected from the group consisting of S, O, N—R, and C—$(R)_2$ wherein R is $C_1$-$C_6$ alkyl;

D is an unsubstituted $C_1$-$C_6$ alkyl;

X is H or a methoxy group;

Y is Z1-C═C—Z2 wherein Z1 and Z2 independently are H or a methoxy group;

L is $CH_3$ or phenyl; and

M is phenyl or an unsubstituted $C_1$-$C_{18}$ amino-alkyl.

2. A fluorescent dye having the formula

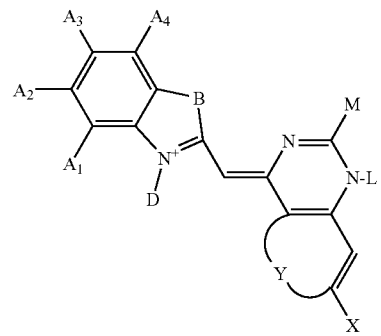

wherein all of $A_1$, $A_2$, $A_3$, and $A_4$ are H or one of $A_1$, $A_2$, $A_3$, and $A_4$ is a halogen and the others are H;

B is selected from the group consisting of S, O, N—R, and C—$(R)_2$ wherein R is $C_1$-$C_6$ alkyl;

D is —$(CH_2)$n-COOH or —$(CH_2)$n-CO—O succinimide, wherein n is a natural number between 1 and 6;

X is H or a methoxy group;

Y is Z1-C═C—Z2 wherein Z1 and Z2 independently are H or a methoxy group;

L is $CH_3$ or phenyl; and

M is phenyl or an unsubstituted $C_1$-$C_{18}$ amino-alkyl.

3. A fluorescent dye having the formula

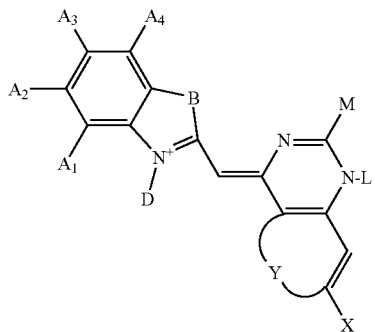

wherein
all of $A_1$, $A_2$, $A_3$, and $A_4$ are H or one of $A_1$, $A_2$, $A_3$, and $A_4$ is a halogen and the others are H;

B is selected from the group consisting of S, O, N—R, and C—$(R)_2$ wherein R is $C_1$-$C_6$ alkyl;

D is an unsubstituted $C_1$-$C_6$ alkyl;

X is H or a methoxy group;

Y is Z1-C=C—Z2 wherein Z1 and Z2 independently are H or a methoxy group;

L is $CH_3$ or phenyl; and

M is —$(CH_2)$n-$N^+$—$(CH_3)_3$, wherein n is a natural number between 1 and 18.

* * * * *